(12) United States Patent
Wood (10) Patent No.: US 7,151,344 B2
(45) Date of Patent: Dec. 19, 2006

(54) ELECTROLUMINESCENT DRIVER CIRCUIT

(75) Inventor: Grady M. Wood, Satellite Beach, FL (US)

(73) Assignee: Intersil Americas Inc., Milpitas, CA (US)

(*) Notice: Subject to any disclaimer, the term of this patent is extended or adjusted under 35 U.S.C. 154(b) by 0 days.

(21) Appl. No.: 10/777,955

(22) Filed: Feb. 12, 2004

(65) Prior Publication Data

US 2004/0160194 A1    Aug. 19, 2004

Related U.S. Application Data

(62) Division of application No. 10/051,865, filed on Jan. 16, 2002, now Pat. No. 6,693,387.

(51) Int. Cl.
*G09G 3/10* (2006.01)

(52) U.S. Cl. ............... 315/169.3; 315/160; 315/169.3; 315/209 R (58) Field of Classification Search ............. 315/169.3, 315/205, 226, 283, DIG. 7, 246, 209 R, 120, 315/129, 119, 224, 169.1, 174, 176, 160
See application file for complete search history.

(56) References Cited

U.S. PATENT DOCUMENTS

| | | | |
|---|---|---|---|
| 4,527,096 A | 7/1985 | Kindlmann | |
| 5,347,198 A | 9/1994 | Kimball | |
| 5,349,629 A * | 9/1994 | Kumano | 455/564 |
| 5,418,434 A * | 5/1995 | Kamens et al. | 315/169.3 |
| 5,525,869 A | 6/1996 | Wood | |
| 5,539,707 A | 7/1996 | Wood | |
| 5,557,175 A | 9/1996 | Wood | |
| 5,808,884 A | 9/1998 | Teggatz et al. | |
| 5,821,701 A * | 10/1998 | Teggatz et al. | 315/307 |
| 5,861,719 A * | 1/1999 | Koskowich et al. | 315/209 R |
| 6,038,153 A * | 3/2000 | Andersson et al. | 363/97 |
| 6,111,362 A * | 8/2000 | Coghlan et al. | 315/169.3 |
| 6,157,138 A * | 12/2000 | Andersson | 315/169.3 |
| 6,320,323 B1 * | 11/2001 | Buell et al. | 315/169.3 |
| 6,462,485 B1 | 10/2002 | Kimball | |
| 6,515,522 B1 | 2/2003 | Inada et al. | |

* cited by examiner

*Primary Examiner*—Hoang V. Nguyen
*Assistant Examiner*—Chuc Tran
(74) *Attorney, Agent, or Firm*—Fogg and Associates LLC; Scott V. Lundberg (57) ABSTRACT

An electroluminescent driver circuit with improved power consumption efficiency. In one embodiment, an electroluminescent driver circuit comprises a load to provide illumination, an inductor, a transistor and a plurality of switches. The inductor has a first side coupled to a positive terminal of a power supply and a second side selectively coupled to the load. The transistor is coupled to selectively conduct current from the second side of the inductor to a ground terminal of the power supply in response to a digital signal. The plurality of switches are coupled to the load to selectively charge and discharge the load. Moreover, the switches selectively provide a discharge path for positive charge on the load to be discharged to the positive terminal of the power supply.

35 Claims, 8 Drawing Sheets

ELECTROLUMINESCENT DRIVER CIRCUIT

CROSS REFERENCE TO RELATED CASES

This application is a divisional application of U.S. application Ser. No. 10/051,865, U.S.P 6,693,387 entitled "Electroluminescent Driver Circuit," filed Jan. 16, 2002.

TECHNICAL FIELD

The present invention relates generally to electroluminescent driver circuits and in particular the present invention relates to an electroluminescent driver circuit with improved power consumption efficiency.

BACKGROUND

An electroluminescent lamp (EL-lamp) is a light source that is typically used for portable (battery operated) electronic devices. An EL-lamp is constructed similar to a capacitor in that it has a dielectric positioned between two electrodes. In an EL-lamp, one of the electrodes is transparent. Typically, a phosphor powder is used to radiate light when a strong electrical field is applied across it. The phosphor powder may be contained in the dielectric layer or it may be in a separate layer that is adjacent the dielectric layer. The EL-lamp is illuminated when an alternating current (AC) is applied across the electrodes. An integrated driver circuit (an EL driver) is typically used to convert direct current (DC) from the battery to a desired AC current. An example of a three port EL driver is described in U.S. Pat. No. 5,347,198 to Kimball which is incorporated herein by reference.

In a typical EL driver application, the EL driver will deliver a voltage to the lamp on the order of 160 to 240 volts peak to peak. The lamp frequency is typically 100 to 800 HZ. If EL-lamps are used as backlights for color displays, a white panel will be used that may require peak-to-peak voltage swings as high as 400V. In this type of application the displays tend to be relatively large. Accordingly, the load will need to store a large amount of energy at each peak to work properly.

It is desired that the EL-lamp and its associated EL driver circuit to generate the maximum amount of illumination with minimum power drain. The efficiency of a typical integrated EL driver is generally less than 35%. This efficiency is calculated as the energy delivered to the load divided by the energy drained from the battery. Accordingly, it is desired in the art to improve the efficiency of EL-drivers.

For the reasons stated above and for other reasons stated below which will become apparent to those skilled in the art upon reading and understanding the present specification, there is a need in the art for an efficient EL-driver.

SUMMARY

The above-mentioned problems with EL-drivers and other problems are addressed by the present invention and will be understood by reading and studying the following specification.

In one embodiment, an electroluminescent driver circuit is disclosed. The electroluminescent driver circuit comprises a load to provide illumination, an inductor, a transistor and a plurality of switches. The inductor has a first side that is coupled to a positive terminal of a power supply and a second side that is selectively coupled to the load. The transistor is coupled to selectively conduct current from the second side of the inductor to a ground terminal of the power supply in response to a digital signal. The plurality of switches are coupled to the load to selectively charge and discharge the load, wherein the switches selectively provide a discharge path for positive charge on the load to be discharged to the positive terminal of the power supply.

In another embodiment, an electroluminescent lamp (EL-lamp) driver circuit is disclosed. The electroluminescent lamp (EL-lamp) driver circuit comprises a first inductor, a first transistor, a load and four switches. The first inductor has one side coupled to a positive terminal of a power supply. The first transistor is used to provide a cyclic charging current path from the second side of the first inductor to ground. The first transistor is cycled on and off by a first digital signal. The load is used to provide an illumination source. The load is coupled to the four switches in a H-bridge configuration. A first pair of the four switches selectively couple the load to a second side of the first inductor and a second pair of the four switches selectively couple the load to the positive terminal of the power supply. The switches are selectively opened and closed to charge and discharge the load, wherein positive charge on the load is discharged to the positive terminal of the power source.

In another embodiment, an EL-lamp circuit is disclosed. The EL-lamp circuit comprises an inductor, a charging transistor, a load and a discharging transistor. The inductor has a first side coupled to a positive terminal of a power supply. The charging transistor is used to provide a cyclic current path from a second side of the charging inductor to a negative terminal of the power supply during a charging portion of a charging/discharging cycle. The charging transistor is controlled by a digital charging signal. The load is selectively coupled to a connection between the second side of the charging transistor and the charging transistor. The discharging transistor is used to provide a cyclic current path from the load to a second side of the inductor during a discharging portion of a charging/discharging cycle. The discharging transistor is controlled by a digital discharging signal, wherein charge stored on the load is discharged to the positive terminal of the power source during a discharge cycle.

In another embodiment, an EL-lamp circuit is disclosed. The EL-lamp circuit comprises a charging inductor, a charging transistor, a load, a discharging transistor and a plurality of switches. The charging inductor has a first side coupled to a positive terminal of a power supply. The charging transistor is used to provide a cyclic current path from a second side of the charging inductor to a negative terminal of the power supply. The charging transistor is controlled by a digital charging signal. The load is selectively coupled to a connection between the second side of the charging transistor and the charging transistor. The discharging inductor has a first side coupled to the positive terminal of the power supply. The discharging transistor is used to provide a cyclic current path from the load to a second side of the discharging inductor. The discharging transistor is controlled by a digital discharging signal. The plurality of switches are coupled to the load to control the charging and discharging of the load, wherein positive charge stored on the load is discharged to the positive terminal of the power source during a discharge cycle.

In another embodiment, an EL-lamp circuit is disclosed. The EL-lamp circuit comprises a first inductor, a first transistor, a second transistor, a load, a first switch, a second switch, a second inductor and a third transistor. The first inductor has a first side and a second side. The first transmitter is used to provide a cyclic current path from a positive terminal of a power supply to the first side of the first inductor. The first transistor is cycled by a first drive signal. The second transistor is used to provide a cyclic current path from the second side of the first inductor to a ground. The second transistor is cycled by a second drive signal. The load is used to provide illumination. The load has a first electrode and a second electrode. A first switch is coupled between the current path between the first transistor and the first side of the first inductor and the first electrode of the load. The second switch is coupled between the current path between the second side of the first inductor and the second transistor and the first electrode of the load. The second inductor has a first side and a second side. The second side is coupled to the positive terminal of the power supply. The third transistor is used to provide a cyclic current path between the first electrode of the load and a first side of the second inductor. The third transistor is cycled by a discharge signal, wherein the third transistor is cycled to discharge positive charge on the first electrode of the load to the positive terminal of the power supply.

In another embodiment, a method of operating an EL-lamp circuit is disclosed. The method comprises storing positive charge on a first electrode of a EL-lamp with a power supply and discharging the positive charge stored on the first electrode to a positive terminal of a power supply.

In another embodiment, a method of operating a cycle of an EL-lamp driver circuit is disclosed. The method comprises placing a select amount of positive charge on a first electrode of a load with a power supply. Discharging the positive charge on the first electrode to a positive terminal of the power supply. Placing a select amount of positive charge on a second electrode of the load with the power supply. Discharging the positive charge on the second electrode to the positive terminal of the power supply.

In another embodiment, a method of operating a cycle of an EL-lamp driver circuit is disclosed. The method comprises placing a select amount of positive charge on a first electrode of a load with a power supply. Discharging the positive charge on the first electrode to a positive terminal of the power supply. Placing a select amount of negative charge on the first electrode of the load with the power supply. Discharging the negative charge on the first electrode to a ground.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

Figure 1:
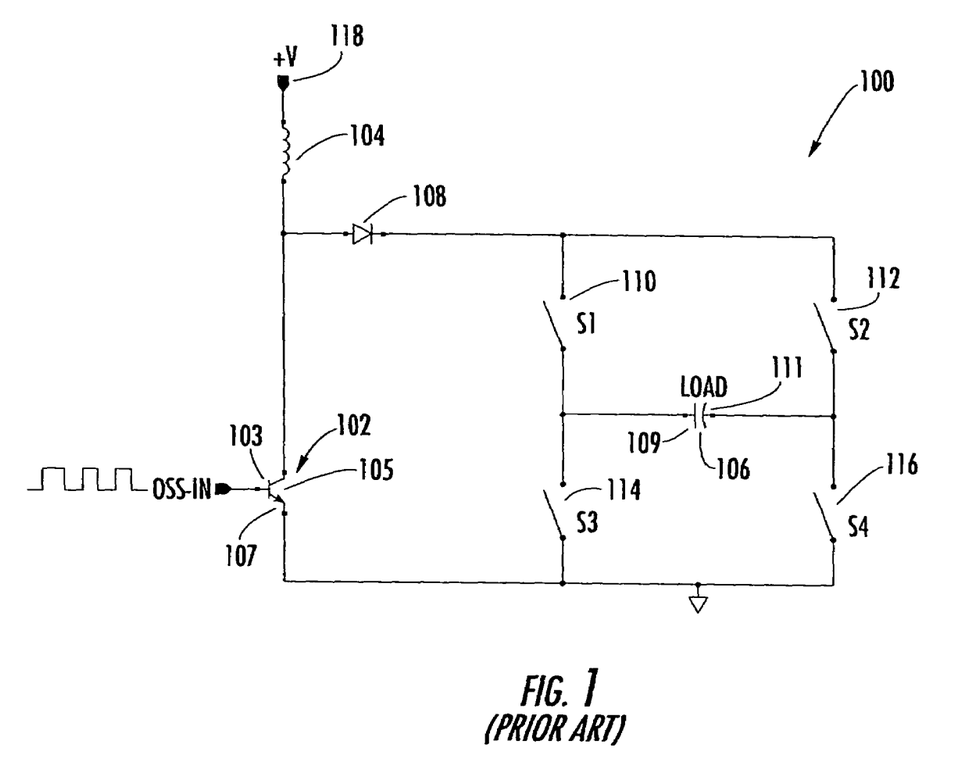
FIG. 1 is a schematic diagram of an EL-lamp circuit of the prior art.

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof Embodiments of the present invention relate to an EL driver that recover stored charge and stored energy on an EL-lamp to improve the efficiency of an EL-lamp circuit. Before a detailed description is presented, further background is provided to aid in the understanding of the present invention. Referring to FIG. 1, a schematic diagram illustrating a simplified EL-lamp circuit 100 of the prior art is shown. In particular, FIG. 1 illustrates an EL-Driver H-bridge output section of the circuit. As illustrated, the EL-lamp circuit 100 includes a transistor 102, an inductor 104, a load 106 (the EL-lamp 106), diode 108 and switches 110 (S1), 112 (S2), 114 (S3) and 116 (S4). As illustrated in FIG. 1, a positive voltage of a battery is coupled to lead 118. Moreover the ground of the battery is coupled to an emitter 107 of the transistor and switches S3 and S4.

The EL-lamp circuit 100 starts operation by first closing switches S1 and S4 and opening switches S2 and S3. Transistor 102 is then cycled on and off by a digital signal as illustrated in FIG. 1. The frequency of the digital signal is typically in the range of 10 kHz to 50 kHz. Typically in a cycle of time, the digital signal provides a longer high signal than a low signal. Accordingly, the time the transistor 102 is on is typically longer than the time it is off time during a cycle. During the time when the transistor 102 is on (a high signal is being applied to the base 103 of the transistor 102), current flows through the inductor 104, and the collector 105 and emitter 107 of the transistor 102 to ground. When the transistor 102 is turned off by a low signal on the base 103, the voltage at the collector 105 begins to rise because the inductor does not. give up the current immediately. This causes a pulse of current to flow through diode 108 and switch S1. Charge will then collect on a first electrode 109 of load 106. Thereafter, during each on-off cycle of the transistor 102 additional charge is delivered to the load and its voltage rises incrementally on each cycle. In closer detail, the amount of illumination that is produced by the load 106, can be determined by the equation illumination=$V^2C$, wherein V is the voltage and C is the frequency. A constant may be introduced into the equation depending upon the color of the illumination and how the load 106 (EL-lamp) is set up. The energy stored on electrode 109 of load 106 each subsequent cycle is $\frac{1}{2}V^2C$, where: C equals the capacitance of the load.

Once a desired voltage is reached on electrode 109 of load 106, switches S1 and S2 are opened and switches S3 and S4 are closed. This causes the load 106 to discharge to 0V (the first electrode 109 is coupled to ground through switch S3). On the next half cycle, switches S1 and S4 are opened and switches S2 and S3 are closed. This causes charge to collect on a second electrode 111 of the load 106. The transistor 102 is again cycled by the digital signal until the load is charged to a desired voltage. Once a desired voltage has been achieved, switches S3 and S4 are then closed thereby dumping the charge on the second electrode 111 of the load 106 to ground.

The above-described steps describe a complete AC cycle across the load 106 in the prior art device of FIG. 1. As described, in each half cycle the charge on the load 106 was simply dumped to ground. In the embodiments of the present invention, the charge on a load (EL-lamp) is returned to the power supply instead of dumping it to the ground to create a more efficient EL-lamp circuit.

Figure 2:
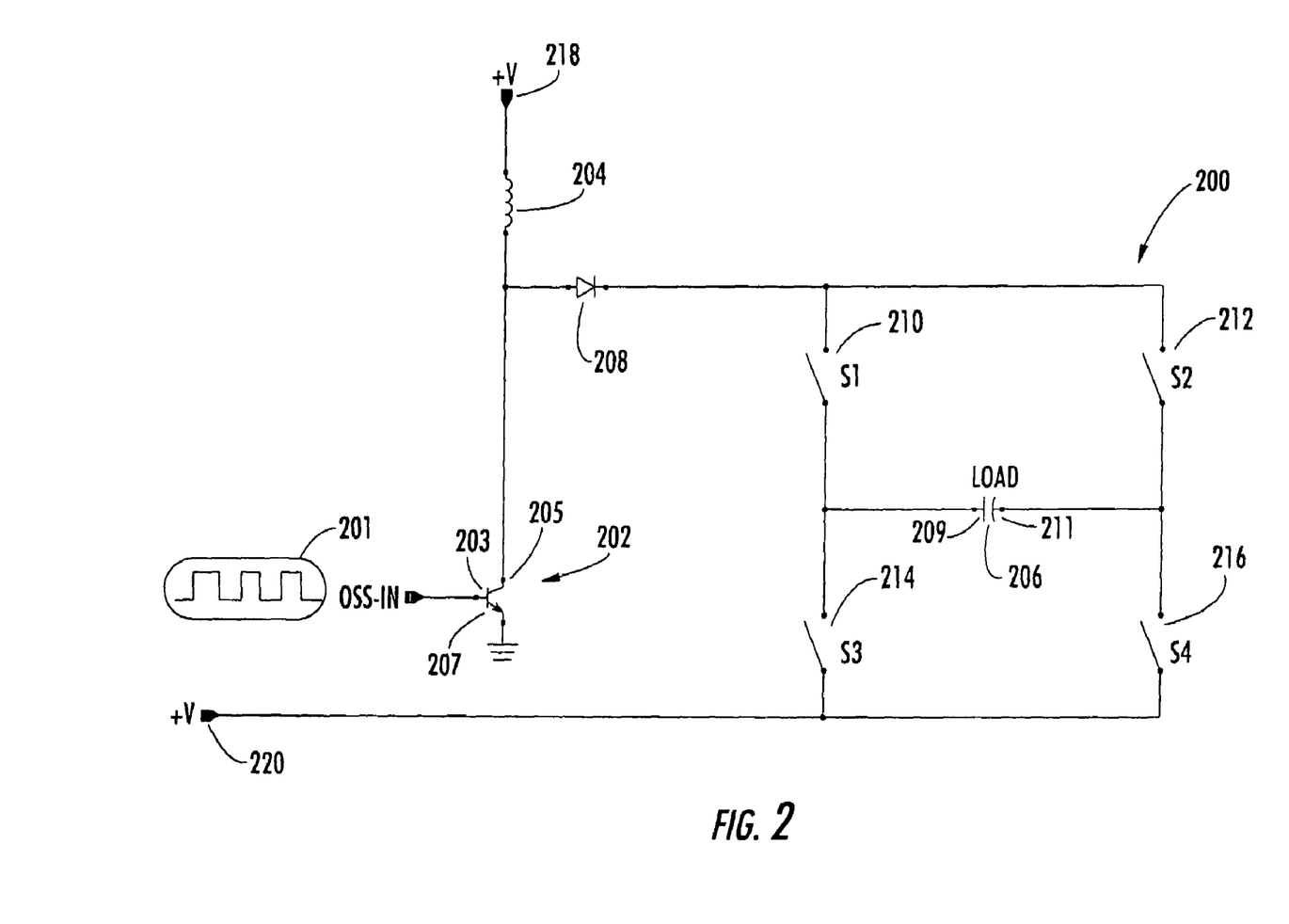
FIG. 2 is a schematic diagram of an EL-lamp circuit of one embodiment of the present invention.

Referring to FIG. 2, one embodiment of an EL-lamp circuit 200 of the present invention is shown. As shown, this embodiment includes transistor 202, inductor 204, load 206 (EL-lamp 206), and switches 210 (S1), 212 (S2), 214 (S3) and 216 (S4). A first side of inductor 204 is coupled to lead 218. Lead 218 is coupled to a positive terminal of a voltage power supply. Another side of inductor 204 is coupled to a collector 205 of transistor 202. An emitter 207 of transistor 202 is coupled to ground. A base 203 of transistor 205 is coupled to receive a digital signal from oscillator 201. An anode of diode 208 is coupled to the connection between the inductor 204 and the collector 205 of the transistor 202. A cathode of diode 208 is coupled to switches 110 and 112. Switch 210 is coupled to switch 214 and switch 212 is coupled to switch 216. A first electrode 209 of the load 206 is coupled to a connection between the switches 210 and 214 and a second electrode 211 of the load is coupled to a connection between switches 212 and 216. Switches 214 and 216 are further coupled to lead 220. Lead 220 is coupled to the positive terminal of the voltage power supply.

Figure 2A:
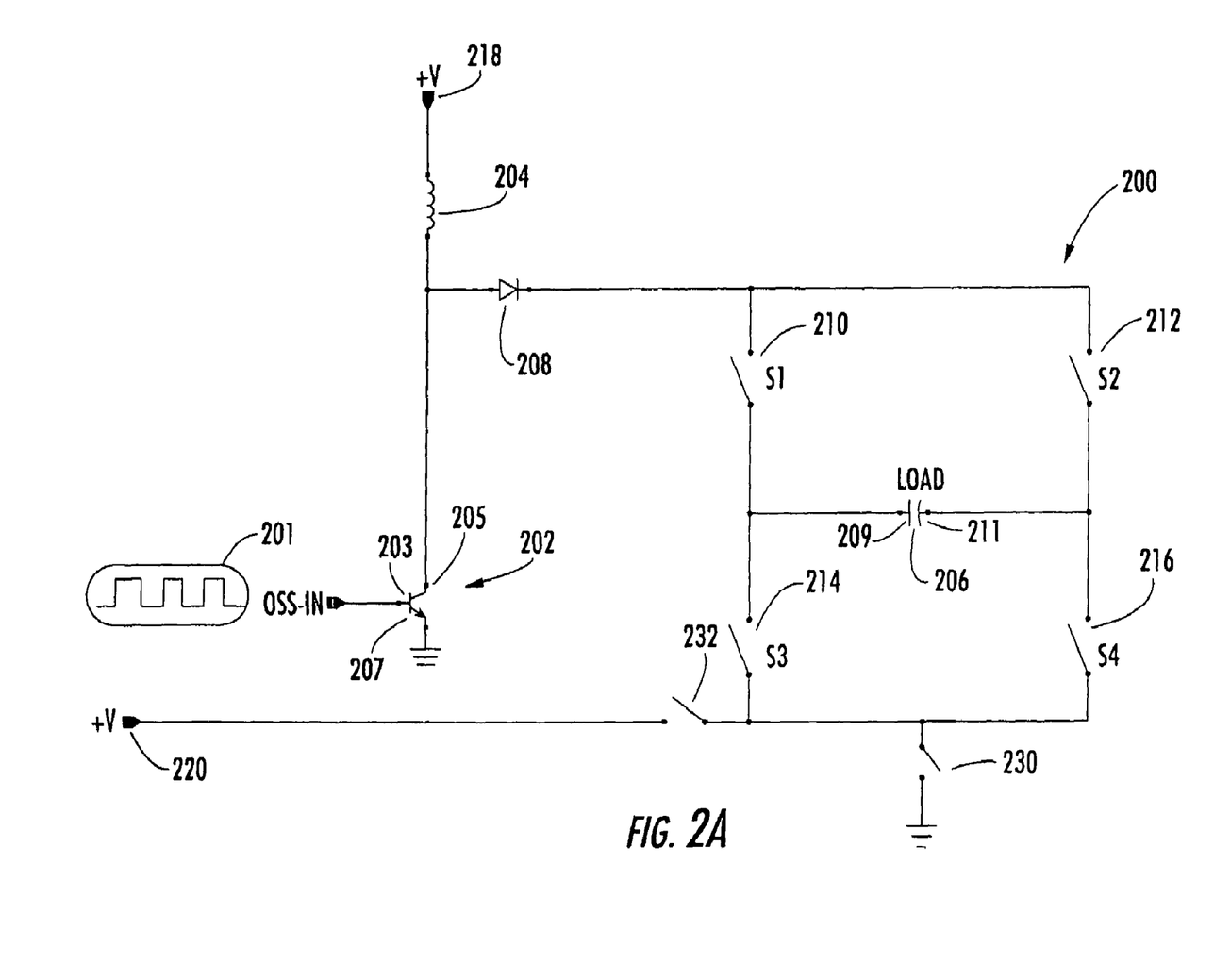
FIG. 2A is a schematic diagram of another embodiment of an EL-lamp circuit of the present invention.

In the embodiment of FIG. 2, charge collected on electrodes 209 and 211 are dumped back into the power source at lead 220 at every half cycle instead of dumping the charge to ground as is done in the known art. In practice, the voltage peaks on the load are much higher than the power supply. For example, output peaks typically range from 80V to 120V while power supply (battery) voltages range from 1.5 to 5 volts. This differential allows most of the stored charge to be dumped back to the battery. In practice, this approach can improve the efficiency of the EL-lamp circuit 200 over the prior art by 10 to 15%. The voltage supply (not shown) and a decoupling circuitry (not shown) must be robust enough to prevent supply noise that would interfere with the circuitry operating from the same voltage supply. Limiting the magnitude of the current dump into the battery can help reduce this effect. Moreover, in another embodiment, illustrated in FIG. 2A, a secondary discharge path to ground is coupled to switches S3 and S4 to ensure the load 206 gets completely discharged. As illustrated, in this embodiment switch 230 and switch 232 selectively couple switches 214 (S3) and 216 (S4) to ground.

Figure 3:
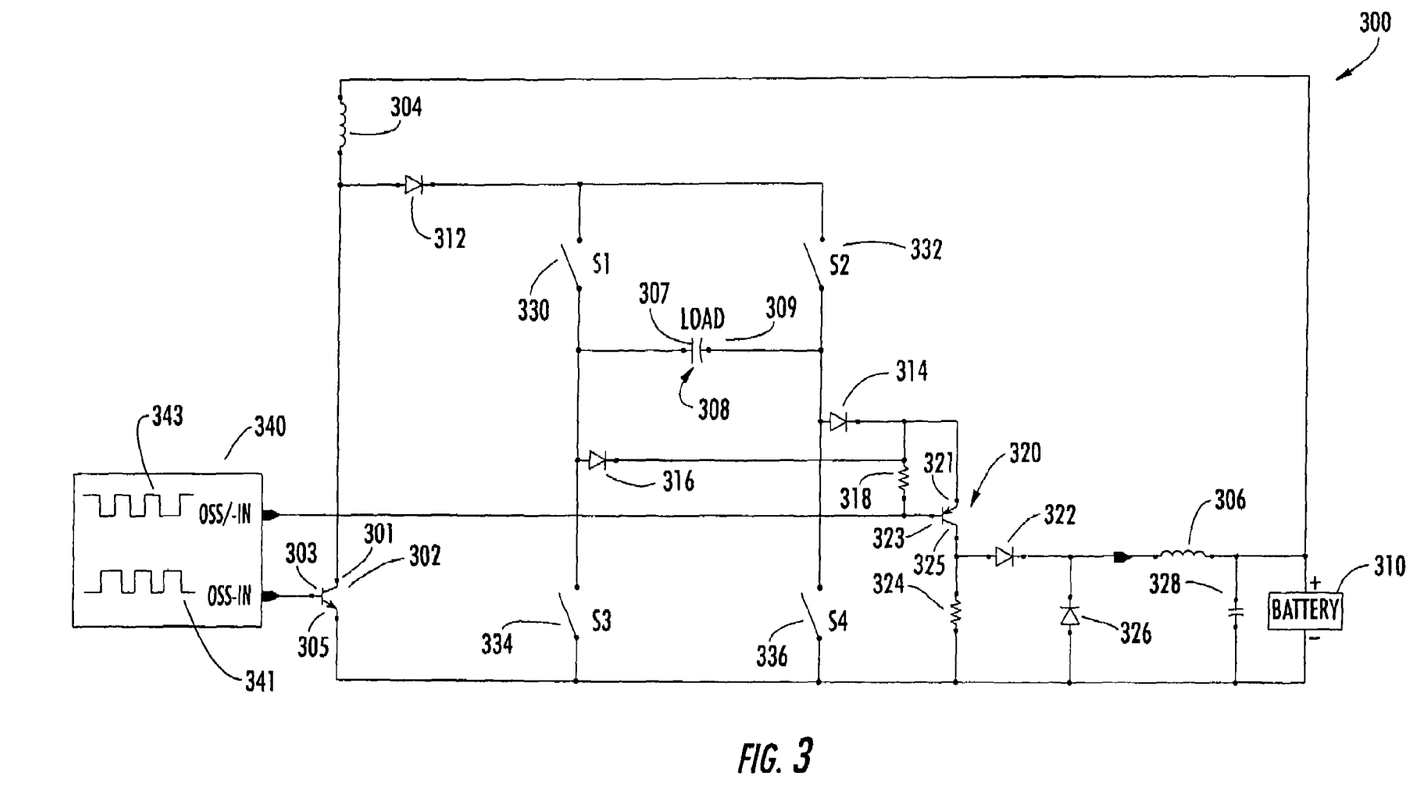
FIG. 3 is a schematic diagram of another embodiment of an EL-lamp circuit of the present invention.

Another embodiment of an EL-lamp circuit 300 of the present invention is illustrated in FIG. 3. As illustrated, this embodiment uses a charging inductor 304 and a discharging inductor 306. A first side of charging inductor 304 is coupled to a positive terminal of a battery 310. A second side of the charging inductor 304 is coupled to a collector 301 of a first transistor 302 (charging transistor 302). A base 303 of first transistor 302 is coupled to receive a first digital signal 341 from oscillator 340. The emitter 305 of transistor 302 is coupled to a negative terminal of the battery 310. As illustrated, this embodiment also includes switches 330 (S1), 332 (S2), 334 (S3) and 336 (S4) coupled in an H bridge configuration. Also included is an EL-lamp 308 (the load 308). The load 308 has a first electrode 307 and a second electrode 309. The first electrode is coupled to a connection between switch 330 and switch 334. The second electrode 309 is coupled to a connection switch 332 and switch 336. An anode of diode 312 is coupled to the connection between the second side of the charging inductor 304 and the collector 301 of the first transistor 302. The cathode of diode 312 is coupled to the connection between switches 330 and 332.

The embodiment of FIG. 3 also includes a second transistor 320 (discharging transistor 320) and diode 314. Diode 314 is coupled to the connection between the second and fourth switches 332 and 336 and the cathode of diode 314 is coupled to the emitter 321 of the second transistor 321. A base 323 of the second transistor 321 is coupled to receive a second digital signal 343 from oscillator 340. A first resistor 324 is coupled between a collector 325 of the second transistor 320 and the negative terminal of the battery 310. Also included in this embodiment is a second resistor 318. The second resistor 318 has a first end coupled to the connection between the cathode of diode 314 and the emitter 321 of transistor 320 and a second end coupled to the base 323 of the second transistor 320.

This embodiment further includes diodes 316, 322 and 326. The anode of the diode 316 is coupled to a connection between the first and third switches 330 and 334 and the cathode of diode 316 is coupled to the first end of the second resistor 318. An anode of diode 322 is coupled to the connection between the collector 325 of the second transistor 320 and resistor 324 and the cathode of diode 322 is coupled to a first end of discharging inductor 306. A second end of the discharging inductor 306 is coupled to a positive terminal of the battery 310. Diode 326 has its cathode coupled to the connection between diode 322 and the first side of discharging inductor 306 and its anode coupled to the negative terminal of the battery 310.

In the embodiment of FIG. 3, the discharging inductor 306 pumps the energy stored on the load 308 each half cycle back to the battery 310. This conservation of energy results in a much larger charge returned back to the battery 310 than the embodiment of FIG. 2. In fact, the charge returned to the battery 310 can be several times the charge stored on the load. Charging of the load 308 of the embodiment of FIG. 3 proceeds in a similar manner as described in the embodiments of FIGS. 1 and 2. The charging cycle (controlled by the first digital signal 341 cycling the first transistor 302) charges the first electrode 307 of the load 308 to its maximum peak value (desired value). The discharging cycle for the embodiment of FIG. 3, however, is different than is described for the embodiment of FIGS. 2. After the first electrode 307 is charged (assume that switches 330, 332, 334, 336 are open at this point). The second transistor 320 is then cycled by the second digital signal 343. When the second transistor 320 is turned on, current will flow from the first electrode 307 of the load 308 through diode 316, through the collector 321 and emitter 325 of the second transistor 320, through diode 322, through the discharging inductor 306 and into the positive terminal of the battery 310. This current increases linearly and is controlled by the voltage differential between the first and second electrodes 307 and 309 of the load and the value of the discharging inductor 306. The load 308 is only discharged during the on time.

When the second transistor 320 is cycled off, the discharging inductor 306 continues to conduct current to the battery 310 through diode 326. That is, during the off time, current flows from ground through diode 326 and the discharging inductor 306 to the positive terminal of the battery 310. The timing is set so the current through the discharging inductor 306 does not have sufficient time to return to zero before the second transistor 320 is turned on again. In addition, it is desired to make the second transistor 320 off time be longer than the on time because it generally takes longer to discharge energy from the discharging inductor 306 during the off time cycle of the second transistor 320. In one embodiment, a single oscillator 340 is used to provide the first and second digital signals 341 and 343 to respectively cycle the first and second transistors 302 and 320. Oscillator 340 is set up to be non-symmetrical with a duty-cycle. For example, a duty cycle of 4 to 1 could be used. That is, in this example, the first transistor 302 is driven such that it is on 4 times as long as it is off and the second transistor 320 is driven so that it is off 4 times as long as it in on. However, other duty-cycles and different frequencies between the first and second signals 341 and 343 to drive the first and second transistors 302 and 320 can be used to maximize the efficiency of the EL-lamp circuit 300.

As illustrated, the embodiment of FIG. 3 also includes the decoupling capacitor 328. The decoupling capacitor 328 is coupled across the terminals of the battery 310 to provide a low-impedance path to ground to prevent undesired stray coupling among circuits in a system. In particular, the decoupling and battery arrangement of the present invention prevents noise from affecting other circuits that may use the battery 310.

Figure 3A:
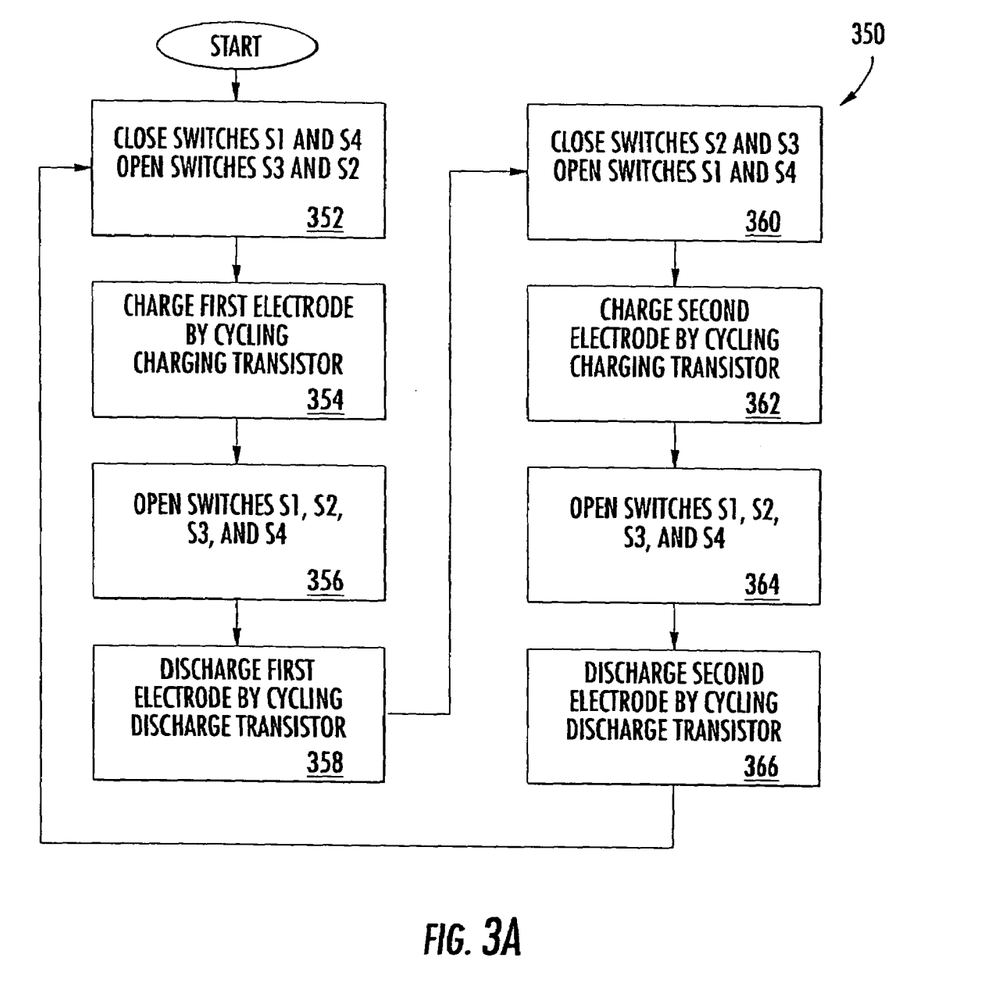
FIG. 3A is a flow chart illustrating a cycle (charging and discharging) of one embodiment of the present invention.

A flow chart 350 illustrating a cycle of EL-lamp circuit 300 is shown in FIG. 3A. As shown, the cycle starts by closing switches 330 (S1) and 336 (S4) and opening switches 334 (S3) and 332 (S2) (352). The first electrode 307 of the load 308 is charged positive by cycling transistor 302 (354) as described above. Switches S1, S2, S3 and S4 are then opened (356). The first electrode 307 is then discharged to the positive terminal of the power supply 310 by cycling the discharge transistor 320 (358). The second half of the cycle starts by closing switches S2 and S3 and opening switches S1 and S4 (360). The second electrode 309 is then charged positive by cycling charging transistor 302 (362). Switches S1, S2, S3 and S4 are then opened (364). The cycle is completed by discharging the second electrode 309 of the load 308 to the positive terminal of the power supply 310 by cycling the discharging transistor (366). The next cycle starts at (352).

Figure 4:
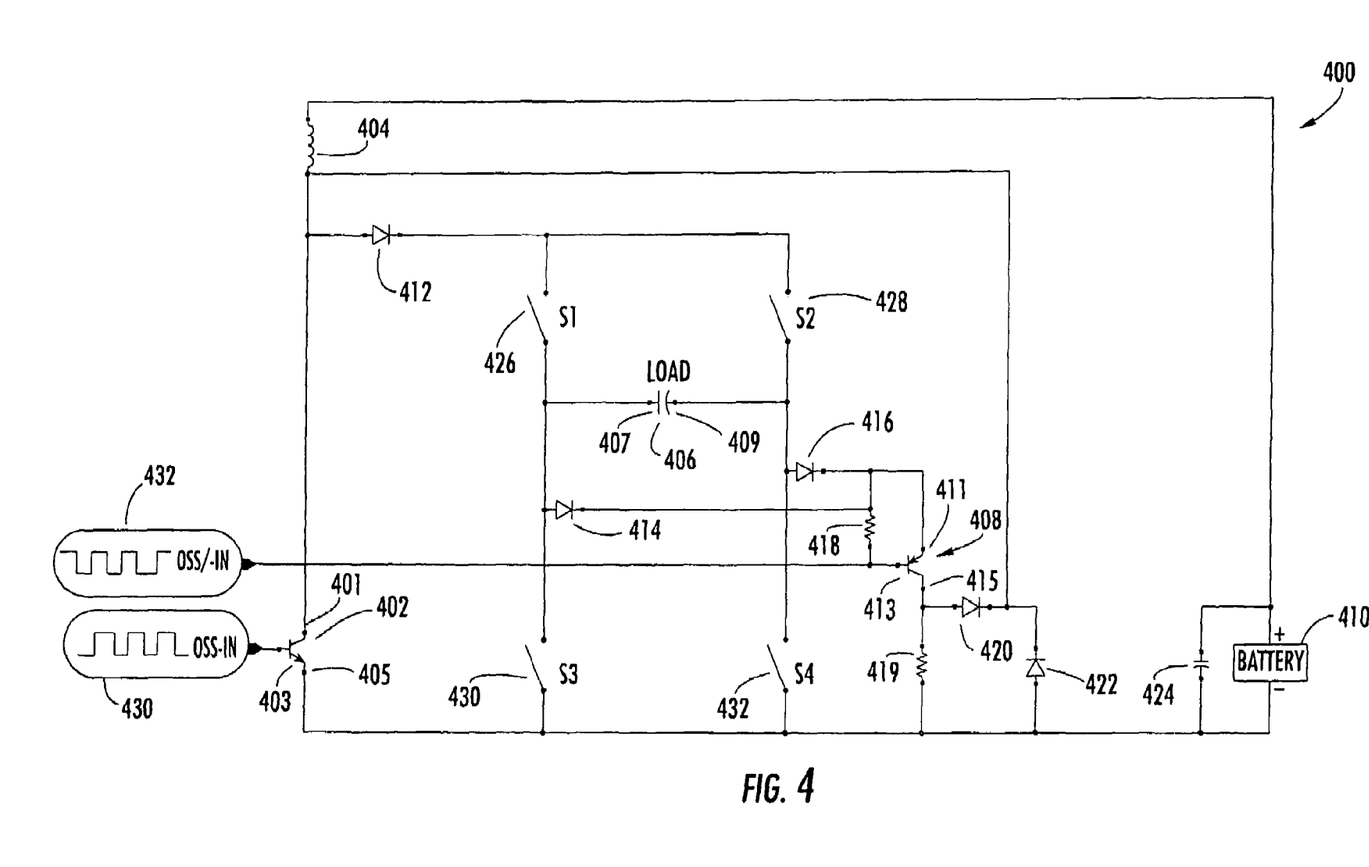
FIG. 4 is a schematic diagram of another embodiment of a EL-lamp circuit of the present invention.

Referring to FIG. 4, another embodiment of the present invention is illustrated. In this embodiment, a single inductor 404 is used for the charging the load 406 as well as discharging the load 406 to the battery 410. As illustrated, a first end of inductor 404 is coupled to the positive terminal of the battery 410. A second end of the inductor 404 is coupled to the collector 401 of a first transistor 402. A base 403 of the first transistor 402 is coupled to receive a first digital signal. The emitter 403 of the first transistor 402 is coupled to the negative terminal of the battery 410. As illustrated, this embodiment also includes switches 426 (S1), 428 (S2), 430 (S3) and 432 (S4) coupled in an H bridge configuration. Also included is an EL-lamp 406 (the load 406). The load 406 has a first electrode 407 and a second electrode 409. The first electrode 407 is coupled to a connection between switch 426 and switch 430. The second electrode 409 is coupled to a connection between switch 428 and switch 432. The anode of diode 412 is coupled between a connection to collector 401 of the first transistor 302 and switches 426 and 428. The cathode of diode 412 is coupled to a connection between switch 426 and switch 428.

The embodiment of FIG. 4 also includes a second transistor 408 and diode 416. An anode of the diode 416 is coupled to a connection between the second and fourth switches 428 and 432 and the cathode of diode 416 is coupled to the emitter 411 of the second transistor 408. A base 413 of the second transistor 408 is coupled to receive a second digital signal. A first resistor 419 is coupled between a collector 415 of the second transistor 408 and the negative terminal of the battery 410. Also included in this embodiment is a second resistor 418. The second resistor 418 has a first end coupled to the connection between the cathode of diode 416 and the emitter 411 of transistor 408 and a second end coupled to the base 413 of the second transistor 408.

This embodiment also includes diode 414, 420 and 422. The anode of the diode 414 is coupled to a connection between the first and third switches 426 and 430 and the cathode of diode 414 is coupled to the first end of the second resistor 418. In addition, diode 420 is coupled to a connection between the collector 415 of the second transistor 408 and a cathode of diode 422. The anode of diode 422 is coupled to the negative terminal of the battery. In this embodiment, the second end of the inductor 404 is coupled to the connection between diode 420 and diode 422. Lastly, a decoupling capacitor 429 is coupled between the positive terminal of the battery and the negative terminal of the battery 410.

In one embodiment of FIG. 4, two oscillators are used. A first oscillator 430 produces a first digital signal to cycle the first transistor 402 during charging operations and a second oscillator 433 produces a second digital signal to cycle the second transistor 408 at a different frequency during discharging operations. Charging of the load 406 takes place as is described above for the embodiments of FIGS. 2 and 3 of the present invention. As stated, discharging to the battery 410 in this embodiment is done with the same inductor 404 that was used to do the charging of the load 406. For example, assume electrode 407 of the load 406 has been charged as described above to a desired level and that switches 426, 428, 430 and 432 are all in their open position. In discharging the load 406 to the battery 410, the second digital signal from the second oscillator 432 is coupled to the base 413 of the second transistor 408 to cycle the second transistor 408 on and off. When the second transistor 408 is cycled on (or turned on) current flows from electrode 407 through diode 414, diode 420, inductor 404 to the positive terminal of battery 410. This current will increase linearly and is controlled by the voltage differential between the first electrode 407 and the second electrode 409 of the load 406 and the size of inductor 404. During the off period of the cycle, inductor 404 will continue to conduct current to the positive terminal of the battery from the negative terminal of the battery and through diode 422 and inductor 404.

As illustrated in FIG. 4, the frequency of the first digital signal provided by the first oscillator 430 (to charge the load) is different than the frequency of the digital second signal from the second oscillator 432 (to discharge the load to the battery). Moreover, in one embodiment the on portion of a cycle of the second digital signal that is applied to the second transistor 408 is shorter than the off portion of the cycle of the second digital signal.

Figure 5:
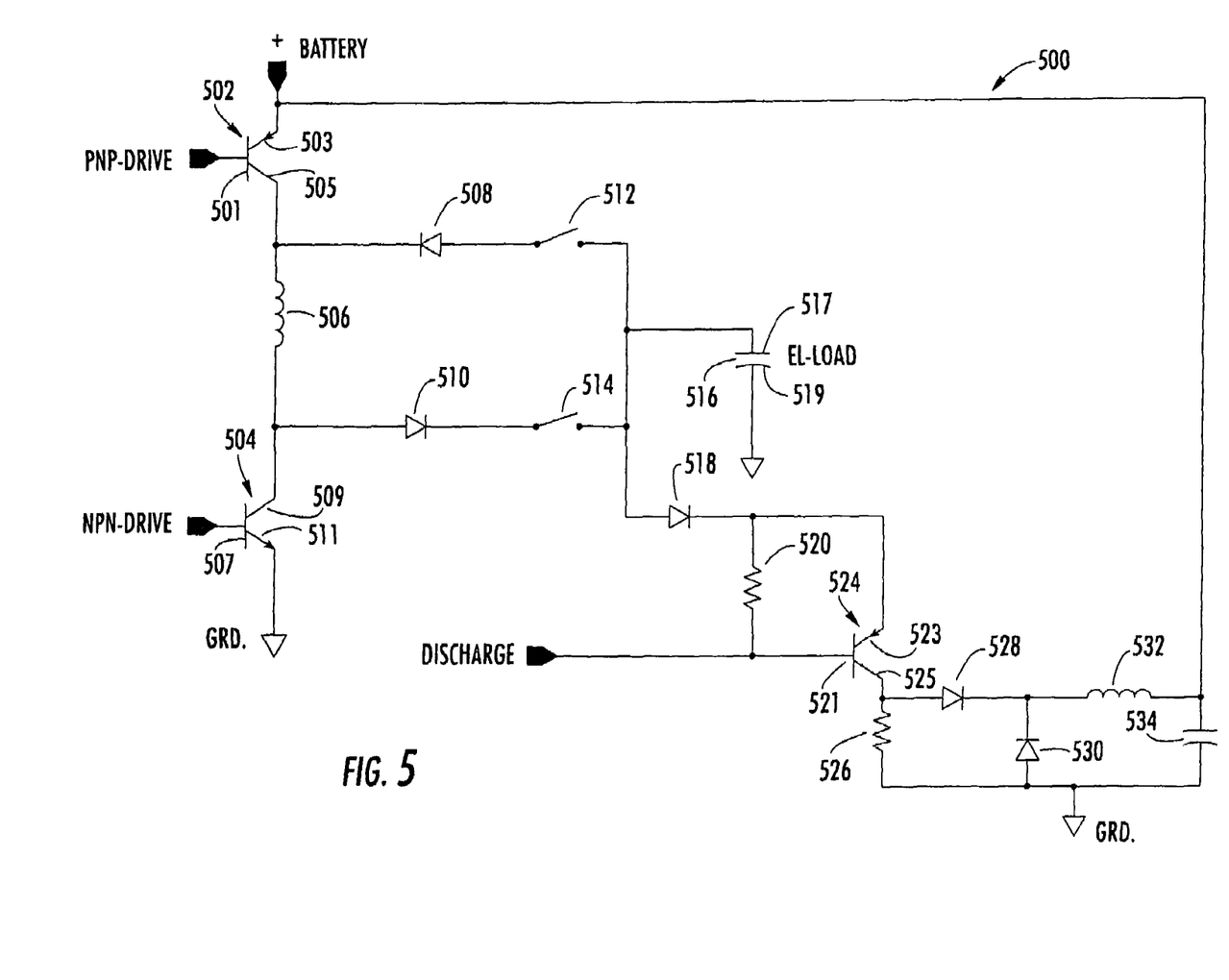
FIG. 5 is a schematic diagram of yet another embodiment of an EL-lamp circuit of the present invention.

Yet another embodiment of the present invention is illustrated in FIG. 5. This embodiment can be applied to three output structures known in the art. As illustrated in FIG. 5, a three port configuration 500 includes a first transistor 502 that is cycled on and off by a PNP-drive signal and a second transistor 504 that is cycled on an off by a NPN-drive signal. In this embodiment, an emitter 503 of transistor 502 is coupled to a positive terminal of a battery. A base 510 of transistor 502 is coupled to receive the PNP-drive signal. A collector 505 of transistor 502 is coupled to a first side of a first inductor 506. A second side of the first inductor 506 is coupled to a collector 509 of transistor 504. The base 507 of transistor 504 is coupled to receive the NPN-drive signal. An emitter 511 of transistor 504 is coupled to ground.

The embodiment of FIG. 5 also includes diode 508 and diode 510. A cathode of diode 508 is coupled to the connection between the collector 505 of transistor 502 and the first side of the first inductor 506. An anode of diode 508 is coupled to switch 512. An anode of diode 510 is coupled to the connection between the second side of the first inductor 506 and the collector 509 of transistor 504. A cathode of diode 510 is coupled to switch 514. As illustrated the other side of switch 512 and 514 are coupled together. Electrode 517 of load (EL-Load) 516 is coupled to the connection between the switch 512 and 514. Moreover, electrode 519 of load 516 is coupled to ground.

This embodiment also includes diodes 518, 528 and 530, resistors 520 and 526, third transistor 524, second inductor 532 and decoupling capacitor 534. An anode of diode 518 is also coupled to the connection between the switch 512 and 514. A cathode of diode 518 is coupled to a first side of resistor 520 and an emitter 523 of transistor 524. A base 521 of transistor 524 is coupled to receive a discharge signal as illustrated. A second side of resistor 520 is coupled to the base 521 of transistor 524. A collector 525 of transistor 524 is coupled to a first side of resistor 526 and an anode of diode 528. A second side of resistor 526 is coupled to ground. A cathode of diode 528 is coupled to a first side of inductor 532 and the cathode of diode 530. A anode of diode 530 is coupled to ground. A second side of inductor 532 is coupled to the positive terminal of the battery. The decoupling diode 534 is coupled between the positive terminal of the battery and ground.

In use, the three port configuration 500 charges electrode 517 of the load 516 positive, then discharges it and then recharges it negative. Although, this configuration does not lend itself to energy recovery as easy as the H bridge approach of the embodiments of FIGS. 2–4, it is possible to recover the positive half cycle. Moreover, the three port configuration 500 requires a process that is passively isolated because an output of the configuration goes above the supply rail and below the ground rail. In charging electrode 517 of load 516 in the positive direction, the first (PNP) transistor 502 is turned on by the PNP-drive signal and the second (NPN) transistor 504 is cycled on and off by the NPN-drive signal. In charging electrode 517 of load 516 in a negative direction, the second (NPN) transistor 504 is turned on by the NPN-drive signal and the first (PNP) transistor 502 is cycled on and off by the PNP-drive signal. To recover the energy on the positive half cycle, both the first and second transistors 502 and 504 are turned off and switch 512 and 514 are opened. The third (discharge) transistor 524 is cycled on and off by the discharge signal causing the positive charge on electrode 517 of the load 516 to be returned to the battery.

Figure 5A:
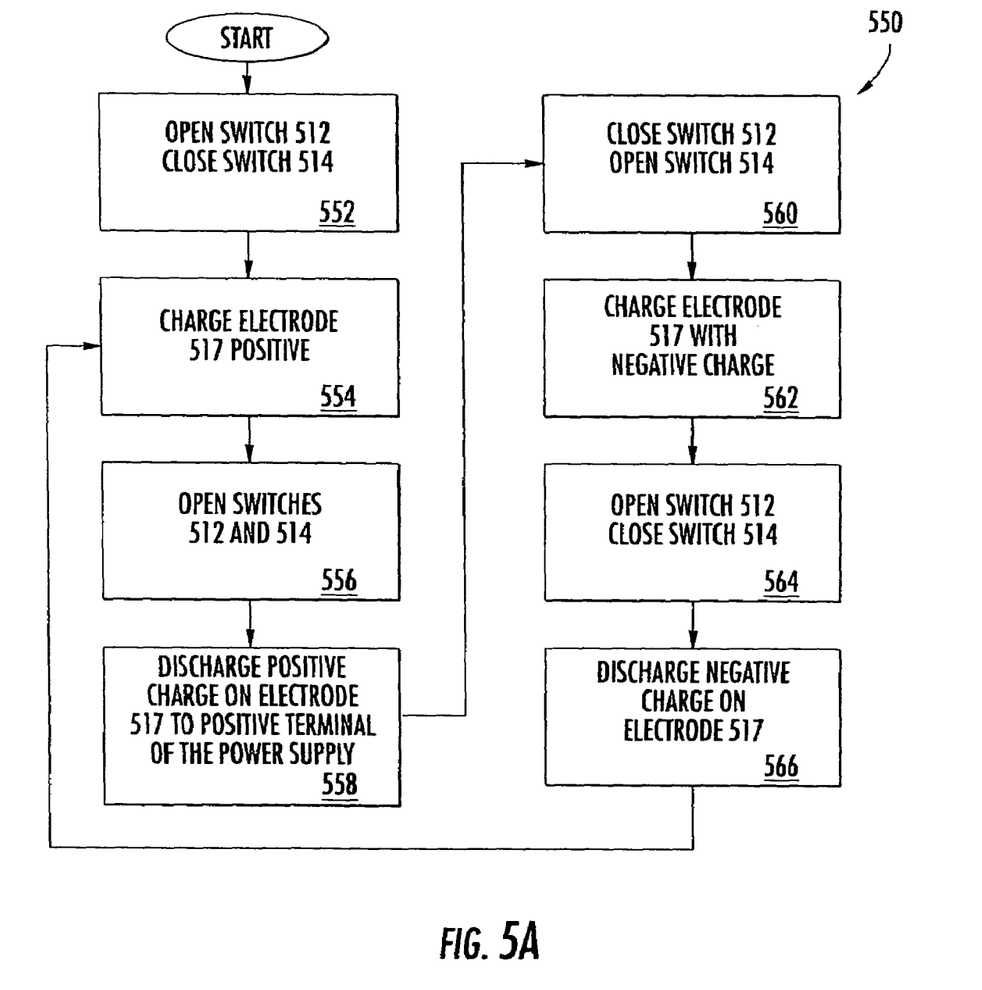
FIG. 5A is a flow chart illustrating a cycle (charging and discharging) of one embodiment of the present invention.

A flow chart 550 illustrating a cycle of charging and discharging of the three port configuration 500 is illustrated in FIG. 5A. As illustrated the cycle begins by opening switch 512 and closing switch 514 (552). Electrode 517 is then charged positive (554) by turning the first (PNP) transistor 502 on by the PNP-drive signal and cycling the second (NPN) transistor 504 on and off by the NPN-drive signal. Switches 512 and 514 are then both opened (556). The positive charge on electrode 517 is then discharged to the positive terminal of the power supply (558) by cycling the third (discharge) transistor 524 on and off with the discharge signal. The next half of the cycle starts by closing switch 512 and opening switch 514 (560). Electrode 517 is then charged negative (562) by turning on the second (NPN) transistor 504 with the NPN-drive signal and cycling the first (PNP) transistor 502 on and off by the PNP-drive signal. Switch 512 is then opened and switch 514 is closed (564). The negative charge on electrode 517 is then discharged to ground (566) by turning the first (PNP) transistor 502 on while the second (NPN) transistor 504 is turned off thereby discharging the negative potential through inductor 506. A new cycle then begins at (554).

Although, FIGS. 2–5 illustrate the embodiments of the present invention having ideal switches and bipolar devices, it will be understood in the art that other types of switches and driving transistors can be implemented, (such as complementary metal-oxide semiconductor (CMOS) and in some cases semiconductor controlled rectifier's (SCR's), and that the present invention is not limited ideal switches and bipolar devices.

Moreover, although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of operating an EL-lamp circuit, the method comprising:
    storing energy on a first electrode of a EL-lamp with a power supply during a charging cycle; and
    pumping the energy stored on the first electrode to a positive terminal of the power supply during a discharging cycle; wherein pumping the energy stored on the first electrode of the load further comprises:
    cycling on and off a discharge current path that couples the first electrode to ground; when the discharge current path is cycled on, conducting current from the first electrode to the positive terminal of the power supply; and
    when the discharge current path is cycled off continuing to conduct current to the positive terminal of the power supply via a discharging inductor.

2. The method of claim 1, wherein the discharge current path is off longer than it is on during the cycle.

3. The method of claim 1, further comprising:
    storing energy on a second electrode of the EL-lamp with the power supply; and
    pumping the energy stored on the second electrode to the positive terminal of the supply.

4. The method of claim 3, wherein pumping the energy stored on the second electrode of the load further comprises:
    cycling on and off a discharge current path that couples the second electrode to ground;
    when the discharge current path is cycled on, conducting current from the second electrode to the positive terminal of the power supply with the use of an inductor; and when the discharge current path is cycled off, conducting current to the positive terminal of the battery via the inductor.

5. A method of operating a cycle of an EL-lamp driver circuit, the method comprising:
placing a select amount of positive charge on a first electrode of a load with a power supply with the use of a charging inductor;
discharging the positive charge on the first electrode to a positive terminal of the power supply with the use of a discharging inductor;
placing a select amount of positive charge on a second electrode of the load with the power supply with the use of the charging inductor; and
discharging the positive charge on the second electrode to the positive terminal of the power supply with the use of the discharging inductor; wherein placing a select amount of positive charge on a second electrode of a load further comprises:
cycling on and off a charging current path through the charging inductor that is coupled between the positive terminal of the power supply and a negative terminal of the power supply; and
when the charging current path is off, coupling charge to the second electrode.

6. The method of claim 5, wherein placing a select amount of positive charge on a first electrode of a load further comprises:
cycling on and off a charging current path through the charging inductor that is coupled between the positive terminal of the power supply and a negative terminal of the power supply; and
when the charging current path is off, coupling charge to the first electrode.

7. The method of claim 5, wherein discharging the positive charge on the first electrode of the load further comprises:
cycling on and off a discharge current path through the discharging inductor that couples the first electrode to the positive terminal of the power supply; and
when the discharge current path is cycled on, conducting current from the first electrode to the positive terminal of the power supply.

8. The method of claim 5, wherein discharging the positive charge on the second electrode of the load further comprises:
cycling on and off a discharge current path through the discharging inductor that couples the second electrode to ground; and
when the discharge current path is cycled on, conducting current from the second electrode to the positive terminal of the power supply.

9. A method of operating a cycle of an EL-lamp driver circuit, the method comprising:
placing a select amount of positive charge on a first electrode of a load with a power supply;
discharging the positive charge on the first electrode to a positive terminal of the power supply;
placing a select amount of negative charge on the first electrode of the load with the power supply; and
discharging the negative charge on the first electrode; wherein placing a select amount of positive charge on the first electrode further comprises:
turning on a first current path between the positive terminal of the power supply and a first side of an inductor; and
cycling on and off a second current path between a second side of the inductor and ground.

10. The method of claim 9, wherein the first current path is turned on by a first transistor and the second current path is cycled on and off by a second transistor.

11. The method of claim 9, wherein discharging the positive charge on the first electrode further comprises:
cycling on and off a third current path between the first electrode and the positive terminal of the power supply.

12. The method of claim 11, wherein the third current path is cycled on and off by a transistor.

13. The method of claim 9, wherein placing a select amount of negative charge on the first electrode further comprises:
turning on a second current path between a second side of an inductor and ground; and
cycling on and off a first current path between the positive terminal of the power supply and a first side of the inductor.

14. The method of claim 13, wherein the second current path is turned on by a second transistor and the first current path is cycled on and off by a first transistor.

15. A method of operating an EL-lamp circuit the method comprising:
storing energy from a power supply on an EL-lamp during a charging cycle; and
returning energy stored on the EL-lamp to the power supply during a discharge cycle via inductive pumping;
cycling a first transistor in response to a-first digital signal daring the charging cycle;
cycling a second transistor in response to a second digital signal during the discharging cycle;
during an off period of the second digital signal, inductively conducting current from a negative terminal of the power supply to a positive terminal of the power supply.

16. The method of claim 15, wherein storing energy from the power supply on an EL-lamp during a charging cycle further comprises:
cycling a first transistor in response to a first digital signal.

17. The method of claim 16, further comprising:
inductively pumping energy to the EL-lamp in response to the cycling of the first transistor.

18. The method of claim 16, wherein the energy stored on the EL-lamp during a charging cycle is $½V^2C$, wherein V is the voltage and C is the capacitance of a load of the EL-lamp.

19. The method of claim 15, wherein storing energy from the power supply on an EL-lamp during a charging cycle further comprises:
selectively creating a charging path to the EL-lamp.

20. The method of claim 19, wherein selectively creating a charging path further comprises:
selectively activating one or more switches.

21. The method of claim 15, wherein returning energy stored on the EL-lamp to the power supply during a discharge cycle further comprises:
selectively providing a discharge path to the power supply during the discharge cycle.

22. The method of claim 21, wherein selectively providing a discharge path to the power supply during a discharge cycle further comprises:
selectively switching one or more switches.

23. The method of claim 21, wherein the discharge cycle is every half cycle.

24. The method of claim 15, wherein returning energy stored on the EL-lamp to the power supply during a discharge cycle further comprises:

cycling a second discharge transistor in response to a second digital signal.

25. The method of claim 24, further comprising:

inductively pumping energy stored on the EL-lamp back to the power supply in response to the cycling of the second transistor.

26. The method of claim 15, wherein returning energy stored on the EL-lamp to the power supply during a discharge cycle further comprises:

selectively creating a discharge path to the power supply.

27. The method of claim 26, wherein selectively creating a discharge path to the power supply further comprises:

activating one or more switches.

28. The method of claim 15, further comprising:

providing a charging path to the EL-lamp during the charging cycle; and providing a discharging path to the power supply during the discharging cycle.

29. The method of claim 15, wherein the frequency of the first digital signal is different than the frequency of the second digital signal.

30. The method of claim 15, wherein an on portion of a cycle of the second digital signal is shorter than an off portion of the cycle of the second digital signal.

31. A method of operating an EL-lamp circuit, the method comprising:

selectively providing a charging path from a power supply to the EL-lamp during a charging cycle;

cycling a first transistor in response to a first digital signal during the charging cycle;

storing energy from a power supply on an EL-lamp during the charging cycle;

selectively providing a discharging path from the El-lamp to the power supply during a discharging cycle;

cycling a second transistor in response to a second digital signal during the discharging cycle; and returning energy stored on the EL-lamp to the power supply during the discharge cycle via inductive energy pumping.

32. The method of claim 31, further comprising:

inductively pumping energy to the El-lamp in response to the cycling of the first transistor.

33. The method of claim 31, wherein the inductive energy pumping is controlled by the cycling of the second transistor.

34. The method of claim 31, wherein selectively providing a charging path from the power supply to the El-lamp during the charging cycle further comprises:

selectively activating one or more switches.

35. The method of claim 31, wherein selectively providing a discharging path from the El-lamp to the power supply during the discharging cycle further comprises:

selectively activating one or more switches.

* * * * *